(12) United States Patent
Hillyard et al.

(10) Patent No.: US 7,356,936 B1
(45) Date of Patent: Apr. 15, 2008

(54) APPARATUS AND METHOD FOR MEASURING COATING ACCUMULATIONS IN A SPRAY BOOTH

(75) Inventors: Gary Hillyard, Marysville, OH (US); Doug Bevard, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 919 days.

(21) Appl. No.: 10/757,261

(22) Filed: Jan. 14, 2004

(51) Int. Cl.
*G01B 5/02* (2006.01)
*G01B 11/02* (2006.01)

(52) U.S. Cl. .......................... 33/284; 33/188; 33/701; 33/DIG. 21; 356/255

(58) Field of Classification Search ............... 33/1 BB, 33/1 H, 227, 228, 276, 278, 284, 288, 299, 33/700, 701, DIG. 21; 356/139.03, 139.04, 356/139.05, 139.06, 139.07, 139.08, 139.1, 356/141.1, 152.1, 152.2, 152.3, 247, 253, 356/254, 255, 614, 615, 634, 635, 636
See application file for complete search history.

(56) References Cited

U.S. PATENT DOCUMENTS

| | | | |
|---|---|---|---|
| 1,292,326 A | | 1/1919 | Jacobson |
| 2,016,546 A | * | 10/1935 | Giebel ......................... 33/274 |
| 2,314,559 A | * | 3/1943 | Schilling ..................... 33/228 |
| 2,873,816 A | | 2/1959 | Umbricht et al. |
| 3,341,016 A | | 9/1967 | Paasche |
| 3,597,092 A | * | 8/1971 | Niss ........................... 356/625 |
| 3,724,950 A | * | 4/1973 | Niss ............................ 356/3 |
| 3,922,921 A | | 12/1975 | Woo |
| 4,015,338 A | | 4/1977 | Kunze et al. |
| 4,096,066 A | | 6/1978 | Kearney |
| 4,295,866 A | | 10/1981 | Kearny |
| 4,475,447 A | | 10/1984 | Kock et al. |
| 4,483,618 A | * | 11/1984 | Hamar ........................ 356/400 |
| 4,492,471 A | * | 1/1985 | Wiklund ...................... 356/622 |
| 4,704,952 A | | 11/1987 | Johnson et al. |
| 5,020,470 A | | 6/1991 | West et al. |

(Continued)

FOREIGN PATENT DOCUMENTS

GB 2258321 A 2/1993

(Continued)

*Primary Examiner*—R. Alexander Smith
(74) *Attorney, Agent, or Firm*—Rankin, Hill & Clark LLP; Vincent Ciamacco (57) ABSTRACT

A method and apparatus are provided for viewing an object (such as a coating overspray accumulation) disposed in a difficult to view area (such as the underside of a lower trough or weir of a cleaning apparatus) and for measuring a distance between first and second points on the object. The apparatus includes a laser, a mirror and a measuring instrument. The mirror reflects a laser beam generated by the laser such that the laser beam is divided into first and second portions that are disposed at a right angle to each other. The laser is moved along a measurement path to a first measurement position that places the second portion of the laser beam at the first point on the object. The laser is then moved along the measurement path to a second measurement position that places the second portion of the laser beam at the second point on the object. Using the measuring instrument, the distance between the first and second measurement positions is then measured, thereby providing a measure of the distance between the first and second points on the object.

30 Claims, 4 Drawing Sheets

U.S. PATENT DOCUMENTS

| | | |
|---|---|---|
| 5,147,422 A | 9/1992 | Neeley et al. |
| 5,617,640 A * | 4/1997 | Izumitani et al. ............. 33/367 |
| 5,617,645 A * | 4/1997 | Wick et al. ................... 33/551 |
| 5,644,438 A | 7/1997 | Pottash |
| 6,193,386 B1 | 2/2001 | Reynolds |
| 6,558,468 B2 | 5/2003 | Masaki et al. |
| 2001/0024273 A1 | 9/2001 | Cannon |
| 2002/0066193 A1 | 6/2002 | Hodge |
| 2002/0135757 A1 | 9/2002 | Shires |

FOREIGN PATENT DOCUMENTS

| | | |
|---|---|---|
| JP | 11217716 A * | 8/1999 |

* cited by examiner

APPARATUS AND METHOD FOR MEASURING COATING ACCUMULATIONS IN A SPRAY BOOTH

BACKGROUND OF THE INVENTION

The present invention generally relates to coating spray booths and more particularly, to apparatus and methods for measuring coating accumulations in spray booths.

A spray booth is typically provided with cleaning apparatus for removing coating overspray from air within the spray booth. Commonly, the cleaning apparatus utilizes water spray and/or water curtains to extract finely divided coating particles from the air. Examples of such cleaning apparatus are disclosed in U.S. Pat. Nos. 4,096,066; 4,295,866; and 4,475,447. As shown in these patents, a cleaning apparatus utilizing a water curtain typically includes an upper trough disposed above a barrier structure. The upper trough is fed with a supply of water so as to overflow and form a falling water curtain in front of the barrier structure. A lower trough is disposed below the barrier structure and collects the falling water from the upper trough. Although not shown in the above referenced patents, a sump area may be disposed below the lower trough and water in the lower trough may be permitted to overflow into the sump area. In so doing, a second, smaller, water curtain is formed. A baffled air duct is disposed behind the barrier structure and includes an exhaust portion fitted with a fan for drawing air upwardly through the air duct. Water spray nozzles may disposed in the air duct.

During a coating operation, a coating technician stands between a back region of the spray booth and the cleaning apparatus and directs a spray of coating onto an object to be coated, in the direction of the cleaning apparatus. In this manner, overspray is directed toward the water curtain(s). Air (with coating overspray) flows through the water curtain(s) and under the barrier structure and/or under the lower trough and into the air ducts, where the air may be further washed with water from the spray nozzles. The cleaned air is then exhausted from the air duct.

In a spray booth of the type described above, the inventors of the present invention noticed that, after a period of time, coating overspray accumulates in increasing amounts in the back region of the spray booth located behind the coating technician. The inventors have studied this problem and have determined the cause of this overspray in the back region. In connection with this determination, the inventors have developed a method and apparatus for viewing and measuring overspray accumulation in a spray booth. The present invention is directed to this method and apparatus.

SUMMARY OF THE INVENTION

In a spray booth having cleaning apparatus of the type described above, the inventors of the subject invention observed that overspray in the air flowing under the lower trough deposits on the bottom of the lower trough. Over time, the deposited overspray accumulates to form rather larger masses, similar to stalactites. The inventors have determined that these overspray accumulations obstruct the passage of air into the air duct, which reduces the air flow through the spray booth, thereby increasing overspray in the spray booth, including the back region thereof. Since the underside of the lower trough is difficult to view, the inventors have developed a measuring device to measure the growth of overspray accumulations thereon.

In accordance with the present invention, the measuring device is provided to view an object (such as an overspray accumulation) disposed in a difficult to view area (such as the underside of a lower trough or weir of a cleaning apparatus) and for measuring a distance between first and second points on the object. The measuring device includes a support structure and a mirror mounted to the support structure. An elongated measuring instrument is mounted to the support structure and includes a series of graduations designating units of measurement. The graduations extend along a length of the measuring instrument. A laser device is movably mounted to the support structure and is operable to generate a laser beam. The laser device is positioned relative to the mirror such that when the laser beam is generated, the laser beam strikes the mirror and is reflected, thereby dividing the laser beam into a first portion extending from the laser to the mirror and a second portion extending from the mirror outward. The laser device is movable along a measurement path extending parallel to the length of the measuring instrument, wherein movement of the laser device along the measurement path causes the second portion of the light beam to move in a travel path disposed perpendicular to the measurement path. The measuring device is adapted for placement in a viewing position, wherein an image of the object is formed in the mirror. When the measuring device is disposed in the viewing position, the distance between the first and second points on the object is measured by placing the laser device in a first measurement position that places the second portion of the laser beam at the first point on the object and then moving the laser device along the is measurement path to a second measurement position that places the second portion of the laser beam at the second point on the object. The distance between the first and second measurement positions is determined using the measuring instrument and provides a measure of the distance between the first and second points on the object.

Also provided in accordance with the present invention is a method of measuring a distance between first and second points on an object. In accordance with the method, a laser beam is generated and reflected such that the laser beam is divided into first and second portions that are disposed at a right angle to each other. The first portion of the laser beam is moved along a measurement path to a first measurement position that places the second portion of the laser beam at the first point on the object. The first portion of the laser beam is then moved along the measurement path to a second measurement position that places the second portion of the laser beam at the second point on the object. The distance between the first and second measurement positions is measured and provides a measure of the distance between the first and second points on the object.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 1:
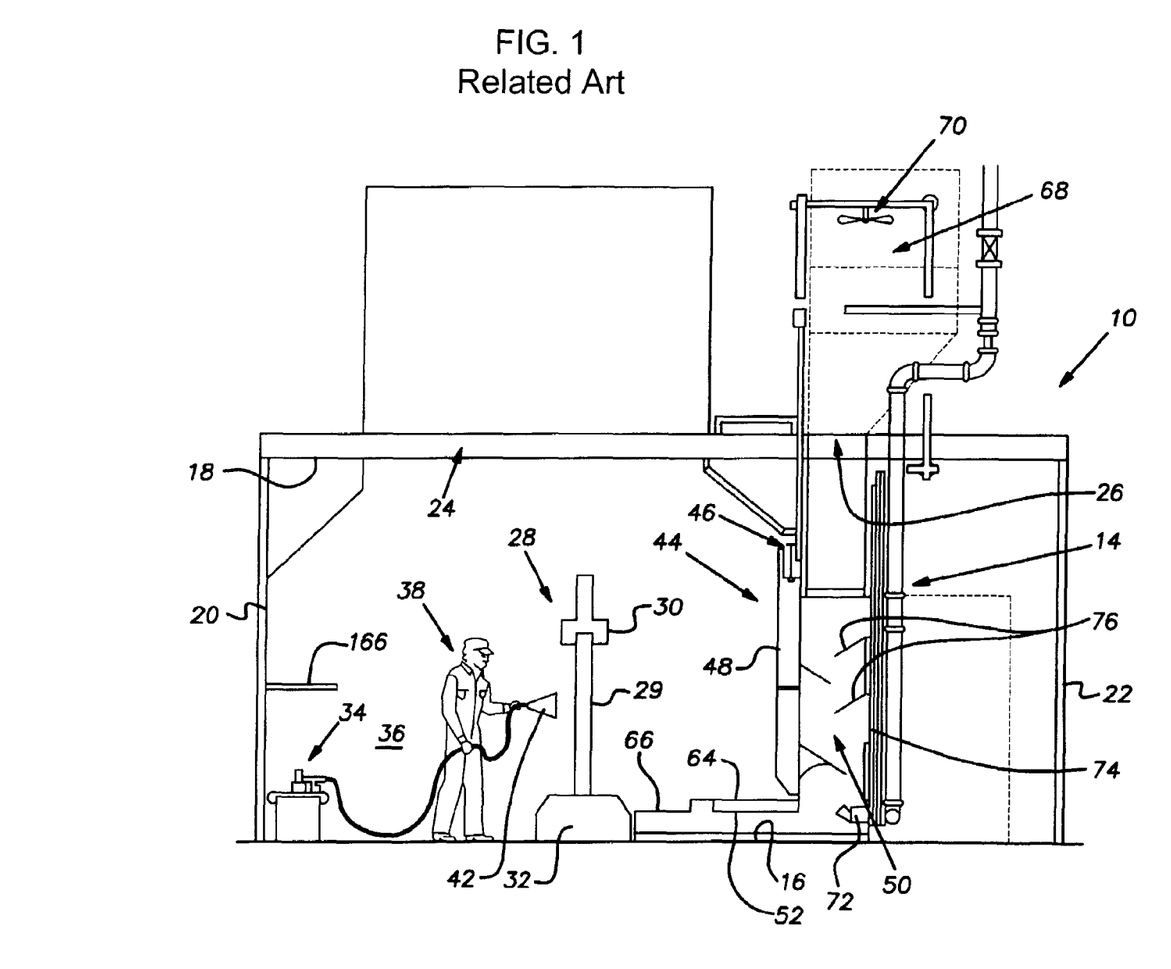
FIG. 1 is an end view of a spray booth having a cleaning apparatus disposed therein.

Referring now to FIG. 1, there is shown a spray booth 10 in which a measuring device (shown in FIGS. 2 and 3 and designated with the reference numeral 12) embodied in accordance with the present invention is utilized to view and measure overspray accumulations on a cleaning apparatus 14 disposed therein. The spray booth 10 is an enclosed structure having a floor 16, a ceiling 18, opposing first and second side walls 20, 22 and opposing end walls (not shown). An air inlet or plenum 24 and an air outlet 26 extend through the ceiling 18. Air enters the spray booth 10 through the plenum 24, which extends the length of the spray booth 10 and most of the width of the spray booth 10. The spray booth 10 is provided with at least one door through which coating technicians may enter and exit the spray booth 10 and with at least two passages through which work pieces may enter and exit. The cleaning apparatus 14 is disposed in the spray booth 10, toward the second wall 22 thereof, and is operable to remove coating overspray from air within the spray booth 10. A holding apparatus 28 for holding one or more work pieces 29 to be coated with paint or other type of coating is disposed in front of the cleaning apparatus 14. The holding apparatus 28 may comprise a carrier (not shown) having a hanger 30 mounted thereto and which is movable along a conveyor 32 extending through the spray booth 10. Spray equipment 34, including one or more pumps, is located toward the first wall 20 of the spray booth 10. A technician area 36 is disposed between the spray equipment 34 and the holding apparatus 28. A coating technician 38 stands in the technician area 36 and utilizes a spray gun 42 to spray a coating (such as a base paint coating) onto the workpiece 29.

The cleaning apparatus 14 includes a housing 44 having an upper trough or weir 46 disposed above a barrier structure 48. An air duct 50 is disposed behind the barrier structure 48. The upper weir 46 is fed with a supply of water from a primary source, such as a water pipe, so as to overflow and form a first falling water curtain in front of the barrier structure 48. Water from a second source, such as condensation, from air flowing through the air duct 50 may also be provided to the upper weir 46. A lower trough or weir 52 (shown in FIG. 2) is disposed below the barrier structure 48 and collects the falling water from the upper weir 46. Water in the lower weir 52 is permitted to overflow to form a second, smaller, falling water curtain. The lower weir 52 includes a bottom wall 54 spaced above the floor 16 of the spray booth 10 by legs (not shown). In the area around the housing 44, the floor 16 helps form a sump region 56 (shown in FIG. 2) for collecting water overflowing from the lower weir 52 (the collected water being designated by the reference numeral 58). The sump region 56 is connected to a sludge pit (not shown). An air passage 62 (shown in FIG. 2) is formed between the surface of the collected water 58 in the sump region 56 and the bottom wall 54 of the lower weir 52. A first grate 64 is disposed over the lower weir 52 and a second grate 66 is disposed over the sump region 56 between the conveyor 32 and the lower weir 52. At least the first grate 64 is removable. Both the first grate 64 and the second grate 66 are supported above the sump region 56 by a support frame (not shown).

The air duct 50 is partially formed by the barrier structure 48 and has an opening partially defined by the bottom end of the barrier structure 48. The opening faces the sump region 56 and is in air flow communication with the air passage 62. The air outlet 26 connects the air duct 50 to an exhaust chamber 68 having a fan 70 disposed therein. A water spray nozzle 72 is disposed in the air duct 50, toward a bottom portion of a rear wall 74 thereof. The spray nozzle 72 is directed upwardly and forwardly. A plurality of baffles 76 are disposed in the air duct 50 and are operable to decrease the velocity and rapidly change the direction of air flowing through the air duct 50, thereby causing entrained liquid to be removed from the air and to fall into the sump region 56.

During a coating operation, the coating technician 38 uses the spray gun 42 to spray an atomized coating onto the work piece 29 held by the holding apparatus 28. The portion of the atomized coating that is not deposited on the work piece 29 (i.e., overspray) travels toward the cleaning apparatus 14. Air with the overspray contacts the first and second falling water curtains, which are effective to wash most of the atomized coating out of the air. Air flows through the second falling water curtain, travels through the air passage 62 and enters the air duct 50. The fan 70 draws the air flows up through the air duct 50, where the air is further washed with water from the spray nozzle 72. The cleaned air then enters the exhaust chamber 68 and is subsequently exhausted to the outside environment.

Although the air flow traveling through the air passage 62 has had most of the overspray removed by the second falling water curtain, there is still residual overspray present in the air flow. A portion of this residual overspray is deposited on the bottom surface of the bottom wall 54 of the lower weir 52. Over a period of time, it has been observed that this deposited overspray forms coating accumulations 80 (shown in FIG. 2), which extend downwardly in a manner similar to stalactites. These accumulations 80 are not visible from the technician area 36 because a view of the accumulations 80 is blocked by the conveyor 32 and the lower weir 52. The space between the conveyor 32 and the lower weir 52 and the space under the lower weir 52 are limited and do not readily accommodate the coating technician 38 or a maintenance technician so as to permit the coating technician 38 or maintenance technician to facilely view and measure the accumulations 80. The measuring device 12 of the present invention, however, permits the coating or maintenance technician to readily do so.

Figure 3:
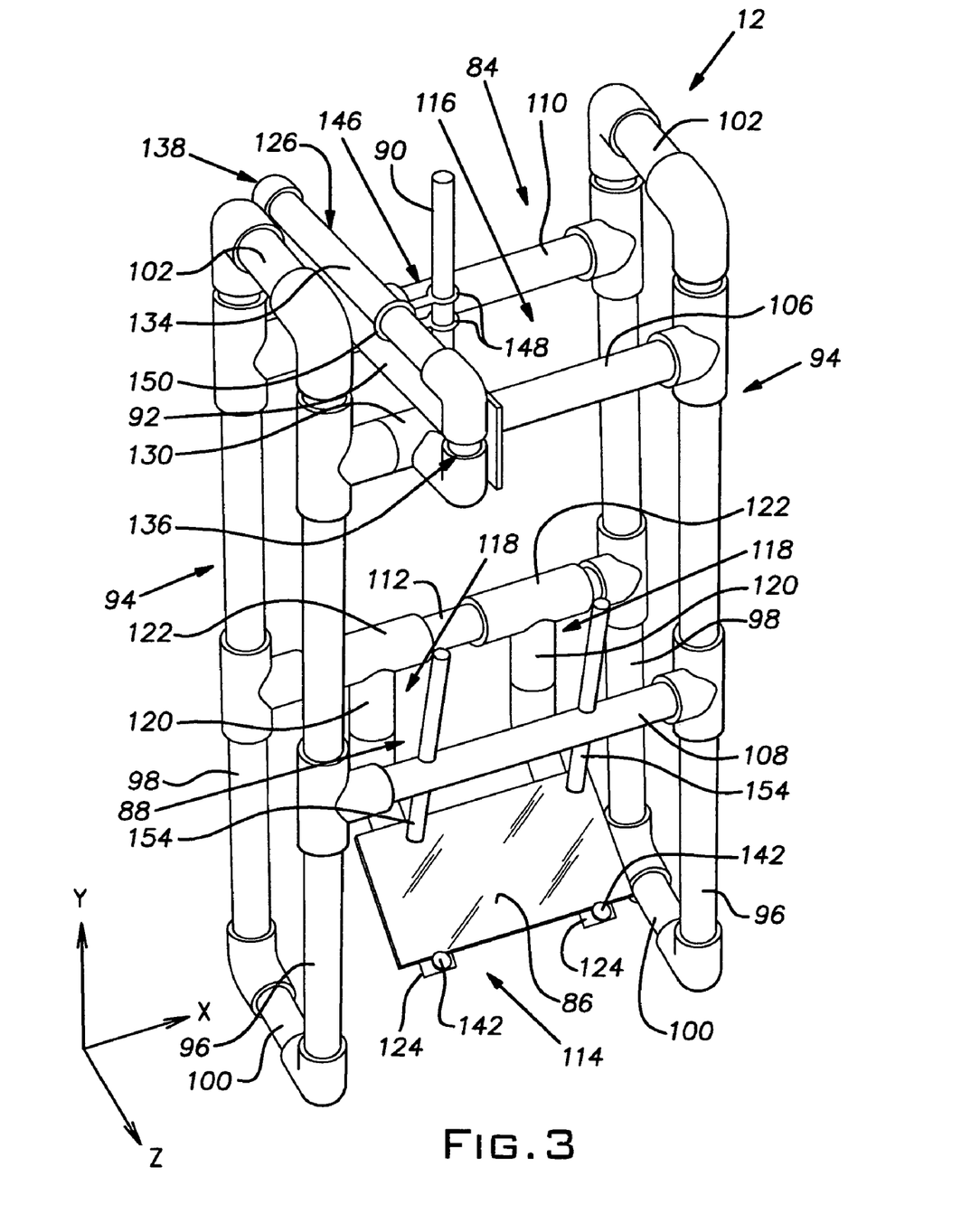
FIG. 3 is a perspective view of the measuring device.

Referring now to FIG. 3, there is shown a perspective view of the measuring device 12, which comprises a support stand or structure 84, a mirror 86, a light source 88, a laser 90 and a graduated measuring instrument 92. The measuring device 12 is operable to measure the dimension of an object, wherein a direct line of sight to the object is blocked. The measuring device 12 has a viewing axis that is to be disposed parallel to the direction of the dimension to be measured.

The support structure 84 is generally rectangular in shape and may be formed from pipes and connectors composed of polyvinyl chloride (PVC). The support structure 84 includes a pair of rectangular side frames 94, each of which comprises a pair of front and rear body members 96,98 connected together by a transversely-extending base member 100 and a transversely-extending top member 102. The base members 100 of the side frames 94 are adapted for supporting the measuring device 12 on a surface, such as the floor 16 of the spray booth 10. In this manner, lowermost surfaces of the base members 100 define a support plane of the measuring device 12.

As used herein, the term "X" direction shall denote the direction between the side frames 94, the term "Y" direction shall denote the direction of the length of the front and rear body members 96, 98 and the term "Z" direction shall denote the direction between the front and rear body members 96, 98.

The side frames 94 are connected together by a plurality of cross members that extend transversely therebetween. The cross members are tubular and include upper and lower front cross members 106, 108 secured between the front body members 96 and upper and lower rear cross members 110, 112 secured between the rear body members 98. Lower portions of the front body members 96 cooperate with the lower front cross member 108 to partially define a lower or first opening 114 in the support structure 84, while top portions of the side frames 94 cooperate with the front and rear upper cross members 106, 110 to define an upper or second opening 116 in the support structure 84. The first and second openings 114, 116 face in directions disposed perpendicular to each other.

A pair of holding structures 118 are connected to the lower rear cross member 112. The holding structures 118 each include an upper arm 120, which extends downwardly from a tubular mount 122 and is joined at an elbow to a lower arm 124. The tubular mounts 122 are circumferentially disposed around the lower rear cross member 112 and are preferably affixed thereto so as to prevent rotational and axial movement of the tubular mounts 122 relative to the lower rear cross member 112. In each holding structure 118, the lower arm 124 extends downwardly and forwardly from the upper arm 120 so as to form an angle therebetween of about 135°. In this manner, the lower arms 124 are disposed at angles of about 45° to a plane disposed parallel to the support plane of the measuring device 12 and, thus, the floor 16 upon which the support structure 84 is to be disposed.

Figure 4:
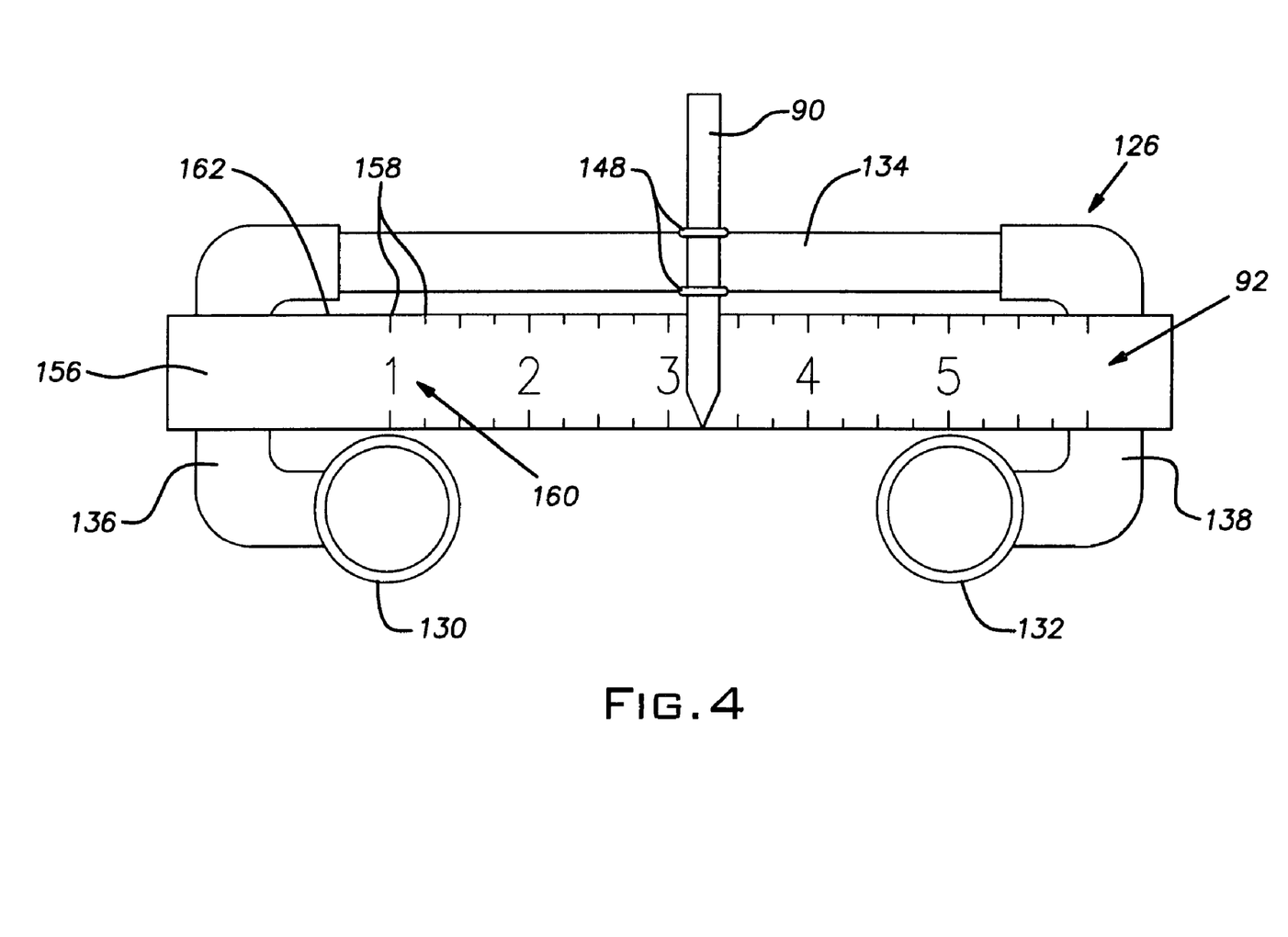
FIG. 4 is a side view of a carriage of the measuring device.

Referring now also to FIG. 4, a carriage 126 is mounted to the upper front and rear cross members 106, 110 so as to be movable in the "X" direction between the side frames 94. The carriage 126 includes tubular front and rear slide mounts 130, 132 that are circumferentially disposed around the upper front and rear cross members 106, 110, respectively, and are slidable along the lengths thereof, respectively. Opposing ends of a tubular main body 134 of the carriage 126 are connected to the front and rear slide mounts 130, 132 by generally C-shaped front and rear connectors 136, 138, respectively. The main body 134 is spaced above the upper front and rear cross members 106, 110 and extends transversely thereto, i.e., the main body 134 extends parallel to the base and top members 100, 102 of the side frames 94. The carriage 126 is slidable in the "X" direction along the upper and front and rear cross members 106, 110 so as to cover most of the distance between the side frames 94 and, more specifically, so as to be movable between positions disposed laterally outward from the lower arms 124 of the holding structures 118, respectively.

The mirror 86 is flat and has a rectangular shape. Conventionally, the mirror 86 comprises a glass substrate with a reflective coating, such as a silver coating, disposed on a bottom surface thereof. An outer protective coating, such as a copper coating, is disposed over the reflective coating. The mirror 86 is disposed on and supported by the lower arms 124 of the holding structures 118. A pair of lower clips 142 secured to the lower arms 124 grip a lower edge of the mirror 86, thereby attaching the mirror 86 to the lower arms 124.

Although not shown, a pair of rotatable upper clips may be provided to grip an upper edge of the mirror 86. With the mirror 86 positioned on the lower arms 124 in the foregoing described manner, the mirror 86 is disposed at an angle of about 45° to a plane disposed parallel to the support plane of the measuring device 12 and, thus, the floor 16 upon which the support structure 84 is to be disposed. Accordingly, the mirror 86 faces both the first and second openings 114, 116 at a 45° angle and is thus positioned to reflect light between the first and second openings 114, 116.

The laser 90 may be any laser, super luminescent diode, or other high intensity light source capable of emission of a high intensity focused beam of light ("laser beam") having a maximum power of less than 5 mW. Preferably, the laser is a class 3a laser and emits red light having a wavelength in a range of 630-680 nm. The laser 90 may be a commercially available pen-type dot pointer. The laser 90 is movably mounted to the main body of the carriage 126 by a clamp structure 146 comprising a pair of holding rings 148 connected to a mounting ring 150. The holding rings 148 are vertically spaced apart and are arranged such that their openings are aligned. The laser 90 extends through the aligned openings and is frictionally held by inner circumferential surfaces of the holding rings 148. The mounting ring 150 is circumferentially disposed around the main body 134 of the carriage 126 and is slidable along the length thereof in the "Z" direction, between the front and rear connectors 136, 138. With the laser 90 mounted to the carriage 126 in the foregoing described manner, the laser 90 directs its laser beam (shown in FIG. 2 and designated with the reference numeral 152) toward the mirror 86 in the "Y" direction and is movable in the "X" and "Z" directions.

Figure 2:
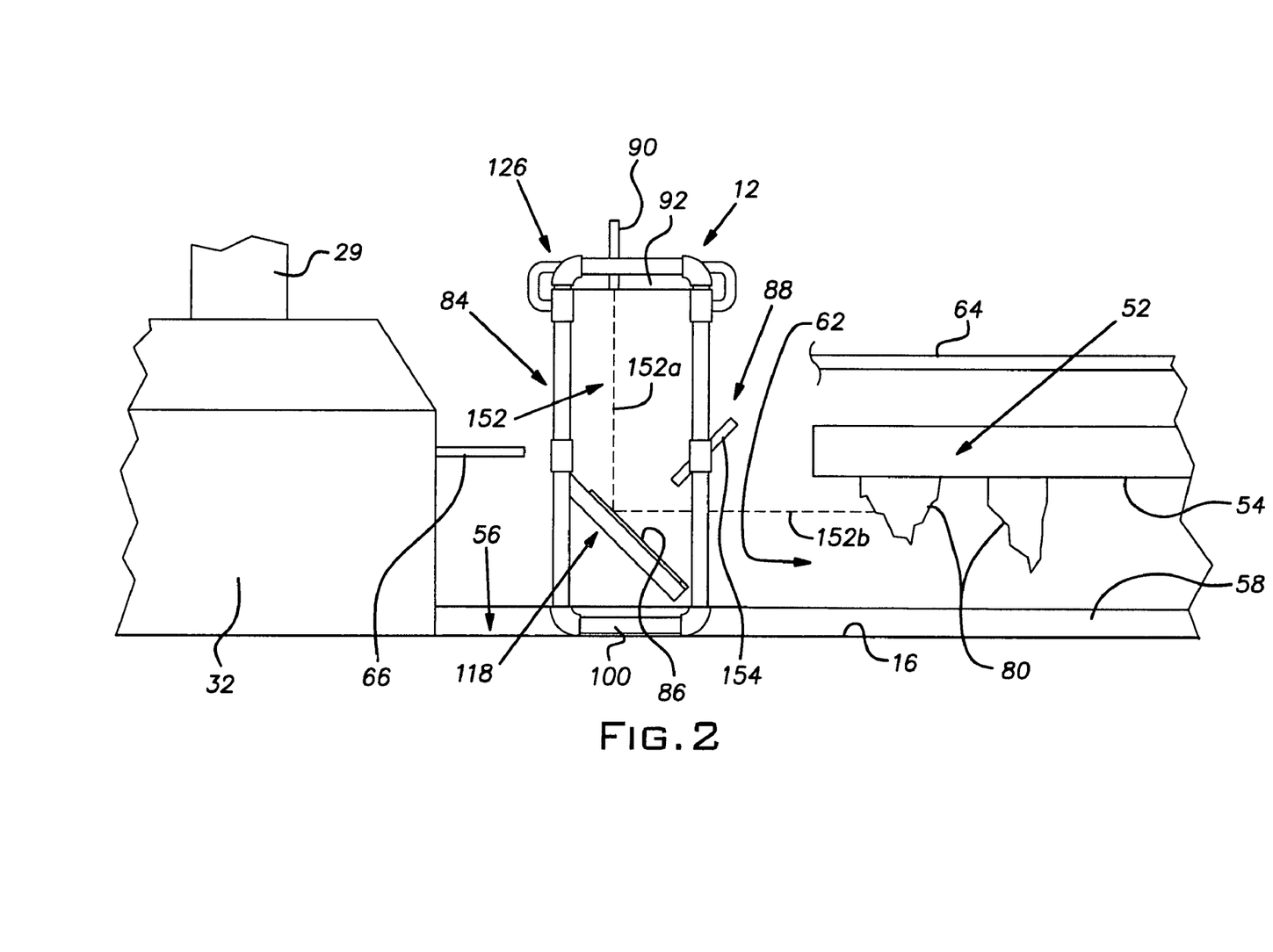
FIG. 2 is an enlarged view of a portion of the spray booth showing a measuring device of the present invention being used to measure a coating accumulation on a portion of the cleaning apparatus.

When the laser beam 152 strikes the mirror 86, the laser beam 152 is reflected so as to change direction and extend in the "Z" direction. The laser beam 152 then passes through the first opening 114 and extends outward toward the object to be measured. In this manner, the mirror 86 divides the laser beam 152 into a first portion 152a extending from the laser 90 to the mirror 86 and a second portion 152b extending from the mirror 86 outward through the first opening 114. The first portion 152a of the laser beam 152 strikes the mirror 86 at an angle of about 45° to an axis normal to the plane of the mirror 86, i.e., the angle of incidence is about 45°. Accordingly, the second portion 152b of the laser beam 152 is reflected at an angle of about 45° to the normal axis of the, i.e., the angle of reflectance is about 45°. Thus, the first and second portions 152a, 152b of the laser beam 152 are disposed perpendicular to each other. In this manner, the movement of the laser 90 along the main body 134 of the carriage 126 in the "Z" direction causes the second portion 152b of the laser beam 152 to move in the "Y" direction, while the movement of the laser 90 with the carriage 126 in the "X" direction also causes the second portion 152b of the laser beam 152 to move in the "X" direction. Due to the laws of reflectivity and the positioning of the mirror 86 and the laser 90, for every unit of distance the laser 90 moves in the "Z" direction, the second portion 152b of the laser beam 152 moves the same unit of distance in the "Y" direction.

The light source 88 is mounted to the lower front cross member 108 and is operable to direct light onto the mirror 86. The light source 80 preferably comprises a pair of spaced-apart lights. More preferably, the light source 80 comprises a pair of spaced-apart flashlights 154. The flashlights 154 are preferably elongated and are operable to generate small diameter beams of light. Of course, these beams of light are more diffuse and less intense than the laser beam 152 from the laser 90. The flashlights 154 are secured in passages extending through the lower front cross member 108. The flashlights 154 are mounted in the passages such that the beams of light generated by the flashlights 154 are laterally aligned with the holding structures 118. In this manner, the light beams form images in the mirror 86 that are spaced apart, thereby permitting the image of the object to be measured to be formed between the light beam images. The light beams from the flashlights 154 impinge upon the mirror 86 at angles less than 45° to the normal axis of the plane of the mirror 86, i.e., the angles of incidence are less than 45°, and, thus, the angles of reflectance are less than 45°. Preferably, the angles of incidence and reflectance of the light beams are selected such that when the measuring device 12 is positioned to measure an object, the reflected portions of the light beams extend above the object and do not directly impinge on the object. In this manner, the light beams are re-directed by the mirror 86 so as to illuminate the area containing the object to be measured, without interfering with the viewing and measurement of the object.

With particular reference to FIG. 4, the measuring instrument 92 comprises an elongated rectangular substrate 156 having a scale or series of graduations 158 designating units of measurement and fractional parts thereof. At least the major or index ones of the graduations 158 are provided with numerical values 160. The measuring instrument 92 may be a conventional ruler, wherein the units of measurement may be English (inches) or Metric (centimeters). Opposing ends of the measuring instrument 92 are secured to the front and rear connectors 136, 138 of the carriage 126, respectively, such that the measuring instrument 92 extends along the length of the main body 134 of the carriage 126, but with a top edge 162 of the substrate 156 spaced below the main body 134. In this manner, the measuring instrument 92 does not block the travel of the clamp structure 146 along the main body 134.

Referring now to FIG. 2, a version of the measuring device 12 is shown that is especially adapted to measure the length of the accumulations 80 on the lower weir 52. Normally, the first grate 64 is removed to permit the measuring device 12 to be disposed in the sump region 56, however, in FIG. 2, a portion of the first gate 64 is shown to illustrate the positioning of the first grate 64 relative to the lower weir 52. The base members 100 of the side frames 94 permit the support structure 84 to be supported on the floor 16 of the spray booth 10 in the sump region 56 such that the viewing axis of the measuring device 12 is disposed at least substantially parallel to the length of the accumulations 80. The depth of the measuring device 12 (as measured between the front and rear body members 96, 98 of the side frames 94) is sufficiently narrow to permit the measuring device 12 to be disposed in the space between the support frame for the first and second grates 64, 66 and the lower weir 52 such that the measuring device 12 is adjacent to the lower weir 52 and the space underneath. In addition, the first opening 114 and the mirror 86 are positioned so as to permit the mirror 86 and the first opening 114 to be aligned with the accumulations 80, thereby permitting a full image of a selected one of the accumulations 80 to be formed in the mirror 86. The angles of incidence and reflectance of the light beams from the flashlights 154 are selected such that the reflected portions of the light beams contact the lower weir 52, above the accumulations 80, and are scattered thereby to illuminate the area around the lower weir 152 (including the space underneath).

With the measuring device 12 positioned as described above and as shown in FIG. 2, the distance between first and second points on the selected accumulation 80 may be measured, wherein the first and second points are chosen so as to provide a measure of the length of the selected accumulation 80. More specifically, the first point is the bottommost point of the selected accumulation 80 and the second point is the point at which the selected accumulation 80 joins the bottom wall 54 of the lower weir 52. Initially, the flashlights 154 and the laser 90 are activated so to generate the light beams and the laser beam 152, respectively. The light beams illuminate the space under the lower weir 52 and the accumulations 80 disposed therein. If necessary, the carriage 126 may be adjusted in the "X" direction to ensure that the selected accumulation 80 forms an image in the mirror 86 that is centered, i.e., is disposed between the holding structures 118. Since the flashlights 154 are laterally aligned with the holding structures 118, the bright images formed by the lights beams in the mirror 86 do not interfere with the image of the selected accumulation 80 formed in the mirror 86. The laser 90 is then moved along the main body 134 of the carriage 126 in the "Z" direction until the second portion 152b of the laser beam 152 (viewed as a dot) is observed as intersecting the first point on the selected accumulation 80. When this first intersection occurs, the position of the laser 90 along the measuring instrument 92 is deemed a first measurement location. The numerical value on the measuring instrument 92 at the first measurement location is noted (and preferably recorded) and is deemed a first measurement. The laser 90 is then moved along the main body 134 of the carriage 126 in the "Z" direction until the second portion 152b of the laser beam 152 is observed as intersecting the second point on the selected accumulation 80. When this second intersection occurs, the position of the laser 90 along the measuring instrument 92 is deemed a second measurement location. The numerical value on the measuring instrument 92 at the second measurement location is noted (and preferably recorded) and is deemed a second measurement. The difference between the first and second measurements is then calculated. Since the amount of movement of the laser 90 in the "Z" direction is equal to the amount of movement of the second portion 152b of the laser beam in the "Y" direction, the difference between the first and second measurements is equal to the distance between the first and second points on the selected accumulation 80, i.e., the length of the selected accumulation.

Using the measuring device 12, a test was conducted to determine if the accumulations 80 on the bottom wall 54 of the lower weir 52 affect the amount of overspray developed in the spray booth 10, especially in the region disposed toward the first wall 20. A clean test panel 166 was weighed to determine its initial weight. The test panel 166 was then disposed in the spray booth 10, behind the technician area 36. After a certain interval of time, the test panel 166 was removed from the spray booth 10 and reweighed. The increase in weight of the test panel 166 was divided by the area of the test panel 166 and was recorded as accumulated overspray. The measuring device 12 was then used to measure the length of accumulations 80 (in the manner described above) at specified locations on the lower weir 52, down the length of the spray booth 10, in the direction between the end walls. The measured lengths were plotted on a graph of location along the length of the spray booth ("x") versus accumulation length ("y") and then the data points were integrated using the Trapezoid rule, namely:

$$Y = \sum_{i=1}^{n} \frac{(Yn - Yn - 1)}{2}(Xn - Xn - 1)$$

The integration yielded a value that was an estimate of the area occupied by the overspray on the bottom of the lower weir 52. This value was then divided by the total vertical area available between the lower weir 52 and the level of the collected water 58 in the sump region 56 and multiplied by 100 to yield a percent blockage.

The foregoing procedure of measuring accumulated overspray and percent blockage was repeated for a plurality of time periods to generate a number of data points sufficient to produce a graph of percent blockage ("x") versus accumulated overspray ("y"). The resulting graph is expected to have a curve with a positive slope, thereby indicating that the increase in size of the accumulations 80 increases the amount of overspray in the spray booth 10. The inventors believe that the increase in size of the accumulations 80 decreases the air flow through the spray booth 10, which results in an increase in overspray.

Although the measuring device 12 is especially adapted to measure the dimensions of the accumulations 80 on the bottom wall 54 of the lower weir 52, it should be appreciated that the measuring device of the present invention is not limited to this application. Other variations of the measuring device of the present invention may provided for measuring accumulations or other objects located in difficult to view locations, such as inside scrubbers, stacks, duct work, drainage facilities, weld baghouses, incinerators and retention ponds. For example, in another embodiment of the measuring device of the present invention, the measuring device may be adapted for measuring accumulations in a cylindrical structure, such as an exhaust stack or a pipe. In this embodiment, the measuring device of the present invention comprise an annular mirror having a central opening through which an elongated support tube extends. The mirror is mounted such that an axis normal to the mirror is disposed at an angle of about 45° to the support tube. A mounting arm is secured to a top end of the support tube and extends outwardly therefrom at a right angle. A ruler is secured to the mounting arm and a laser is mounted to the mounting arm so as to be movable along the length of the ruler. The laser generates a laser beam having a first portion that extends from the laser to the mirror in a direction parallel to the support tube and a second portion that extends outwardly from the mirror in a direction perpendicular to the support tube. The support tube is rotatable relative to the mirror and a protractor is provided to measure the angular movement of the laser (and the support tube). With this construction, linear movement of the laser can be used to measure the radial extent of an accumulation in the cylindrical structure, while the angular movement of the laser (and the support tube) can be used to measure the circumferential extent of the accumulation.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A measuring device for viewing an object disposed in a difficult to view area and for measuring a distance between first and second points on the object, said measuring device comprising:
   a support structure;
   a mirror mounted to the support structure;
   an elongated measuring instrument mounted to the support structure and having a series of graduations designating units of measurement, said graduations extending along a length of the measuring instrument;
   a laser device movably mounted to the support structure and operable to generate a laser beam, said laser device being positioned relative to the mirror such that when the laser beam is generated, the laser beam strikes the mirror and is reflected, thereby dividing the laser beam into a first portion extending from the laser to the mirror and a second portion extending from the mirror outward, said laser device being movable along a measurement path extending parallel to the length of the measuring instrument, wherein movement of the laser device along the measurement path causes the second portion of the light beam to move in a travel path disposed perpendicular to the measurement path;
   wherein the measuring device is adapted for placement in a viewing position, wherein an image of the object is formed in the mirror; and
   wherein when the measuring device is disposed in the viewing position, the distance between the first and second points on the object is measured by placing the laser device in a first measurement position that places the second portion of the laser beam at the first point on the object and then moving the laser device along the measurement path to a second measurement position that places the second portion of the laser beam at the second point on the object, wherein the distance between the first and second measurement positions is determined using the measuring instrument and provides a measure of the distance between the first and second points on the object.

2. The measuring device of claim 1, further comprising a light source mounted to the support structure and operable to generate at least one light beam, said light source being positioned relative to the mirror such that when the at least one light beam is generated, the at least one light beam strikes the mirror and is reflected outward, wherein when the measuring device is disposed in the viewing position and the at least one light beam is generated, the at least one light beam illuminates the area around the object.

3. The measuring device of claim 2, wherein the light source comprises a pair of flashlights and the at least one light beam comprises a pair of light beams generated by the flashlights, respectively.

4. The measuring device of claim 3, wherein the flashlights are spaced apart so as to form spaced-apart light beam images in the mirror.

5. The measuring device of claim 1, wherein the support structure at least partially defines first and second openings, and wherein the mirror is positioned so as to reflect light between the first and second openings.

6. The measuring device of claim 1, wherein the support structure comprises a pair of side frames having at least one cross member extending transversely therebetween.

7. The measuring device of claim 6, wherein a carriage is mounted to the at least one cross member so as to be movable between the side frames, and wherein the laser device is mounted to the carriage.

8. The measuring device of claim 7, wherein the laser device is mounted to the carriage so as to be movable relative to the carriage in a direction perpendicular to the direction between the side frames.

9. The measuring device of claim 6, wherein the side frames comprise base members, respectively, for supporting the measuring device on a surface, said base members defining a support plane of the measuring device.

10. The measuring device of claim 9, wherein the mirror is mounted to the support structure so as to be disposed at about a 45° angle to a plane disposed parallel to the support plane of the measuring device.

11. The measuring device of claim 10, wherein the first portion of the laser beam extends about perpendicular to the support plane of the measuring device.

12. The measuring device of claim 1, wherein the first portion of the laser beam is disposed about perpendicular to the second portion of the laser beam.

13. The measuring device of claim 1, wherein the laser device is a class 3a laser.

14. A measuring device for viewing an object disposed in a difficult to view area and for measuring a distance between first and second points on the object, said measuring device comprising:
　a support structure including:
　　a pair of spaced-apart frames defining a first spacing therebetween;
　　pair of spaced-apart upper cross members extending transversely between the frames, said upper cross members defining a second spacing therebetween; and
　　carriage movably mounted to the cross members;
　a mirror mounted to the support structure and positioned to reflect light between the first and second spacings;
　an elongated measuring instrument mounted to the carriage and having a series of graduations designating units of measurement, said graduations extending along a length of the measuring instrument;
　a laser device mounted to the carriage for movement relative thereto and operable to generate a laser beam, said laser device being positioned relative to the mirror such that when the laser beam is generated, the laser beam strikes the mirror and is reflected, thereby dividing the laser beam into a first portion extending from the laser to the mirror and a second portion extending from the mirror outward through the first spacing, said laser device being movable along a measurement path extending parallel to the length of the measuring instrument, wherein movement of the laser device along the measurement path causes the second portion of the laser beam to move in a travel path disposed perpendicular to the measurement path;
　wherein the measuring device is adapted for placement in a viewing position adjacent to the object, wherein the first spacing is aligned with the object such that an image of the object is formed in the mirror, said image being viewable through the second spacing; and
　wherein when the measuring device is disposed in the viewing position, the distance between the first and second points on the object is measured by placing the laser device in a first measurement position that places the second portion of the laser beam at the first point on the object and then moving the laser device along the measurement path to a second measurement position that places the second portion of the laser beam at the second point on the object, wherein the distance between the first and second measurement positions is determined using the measuring instrument and provides a measure of the distance between the first and second points on the object.

15. The measuring device of claim 14, wherein the support structure further comprises a pair of spaced-apart lower cross members extending transversely between the frames, and wherein the mirror is connected to a rear one of the lower cross members.

16. The measuring device of claim 15, further comprising a light source mounted to a front one of the lower cross member and operable to generate at least one light beam, said light source being positioned relative to the mirror such that when the at least one light beam is generated, the at least one light beam strikes the mirror and is reflected outward, wherein when the measuring device is disposed in the viewing position and the at least one light beam is generated, the at least one light beam illuminates the area around the object.

17. The measuring device of claim 16, wherein the light source comprises a pair of flashlights and the at least one light beam comprises a pair of light beams generated by the flashlights, respectively.

18. The measuring device of claim 17, wherein the flashlights are spaced apart so as to form spaced-apart light beam images in the mirror.

19. The measuring device of claim 16, wherein the side frames comprise base members, respectively, for supporting the measuring device on a surface, said base members defining a support plane of the measuring device.

20. The measuring device of claim 19, wherein the support structure further comprises at least one holding structure secured to the rear one of the lower cross members, said at least one holding structure holding the mirror so as to be disposed at about a 45° angle to a plane disposed parallel to the support plane of the measuring device.

21. A method of measuring a distance between first and second points on an object, said method comprising the steps of:
　viewing the object with a fixed mirror;
　generating a laser beam;
　reflecting the laser beam with the mirror such that the laser beam is divided into first and second portions that are disposed at a right angle to each other;
　moving the first portion of the laser beam along a measurement path to a first measurement position that places the second portion of the laser beam at the first point on the object as viewed by the mirror;
　moving the first portion of the laser beam along the measurement path to a second measurement position that places the second portion of the laser beam at the second point on the object as viewed by the mirror; and
　measuring the distance between the first and second measurement positions, which provides a measure of the distance between the first and second points on the object.

22. The method of claim 21, further comprising the steps of
　generating at least one light beam; and
　reflecting the at least one light beam so as to illuminate the area around the object.

23. The method of claim 22, wherein the steps of reflecting the laser beam and the at least one light beam is performed using the mirror.

24. The method of claim 23, wherein the angle of incidence of the laser beam striking the mirror is greater than the angle of incidence of the at least one light beam striking the mirror.

25. The method of claim 24, wherein the angle of incidence of the laser beam striking the mirror is about 45°.

26. The method of claim 21, wherein the measurement path is a straight line.

27. The method of claim 26, wherein the step of measuring the distance between the first and second measurement positions is performed using a ruler.

28. The method of claim 21, wherein the first portion of the laser beam extends vertically and the second portion of the laser beam extends horizontally.

29. The method of claim 28, wherein the object is a paint accumulation formed on a bottom wall of a lower weir of a cleaning apparatus in a paint spray booth, and wherein the paint accumulation extends vertically.

30. The method of claim 21, wherein the measurement path is in a horizontal plane and the first and second points on the object are coplanar in a vertical plane.

* * * * *